Dec. 26, 1967   F. L. BETCHART   3,360,280
HORIZONTALLY AND VERTICALLY MOVABLE FIFTH
WHEEL FOR TRUCK-TRACTORS
Filed Oct. 6, 1965   4 Sheets-Sheet 1
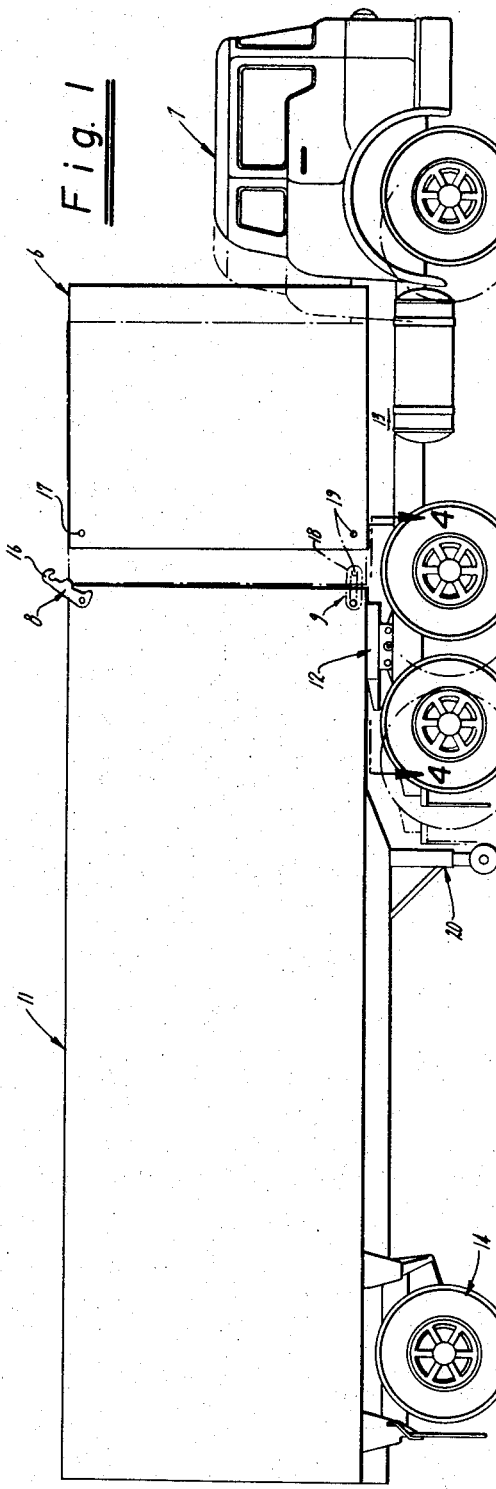
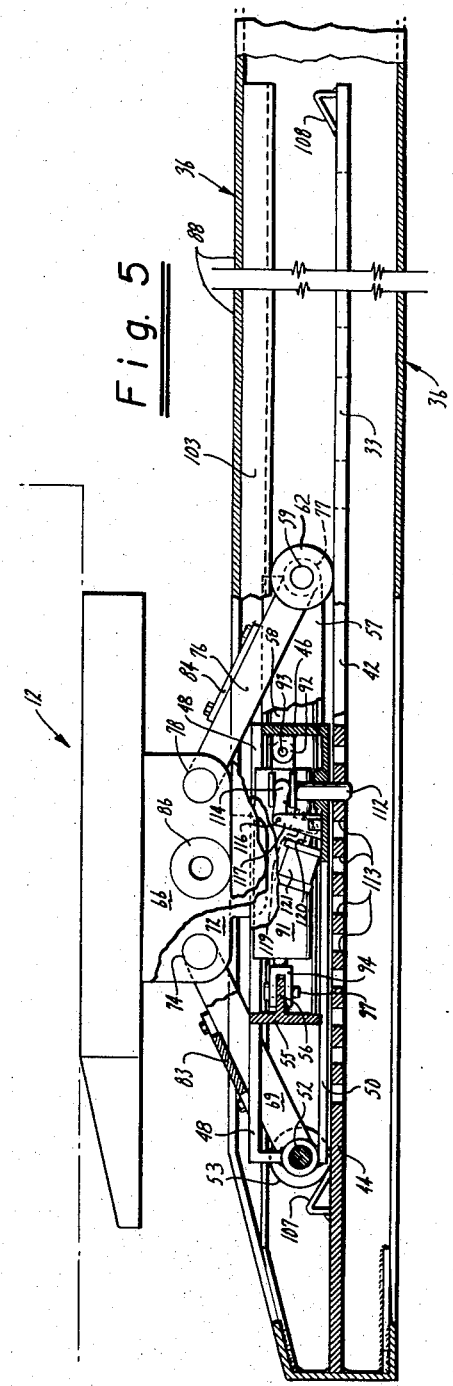
INVENTOR.
Frank L. Betchart
BY
*Warren, Brosler, Gypher, Anglin*
*His* Attorneys

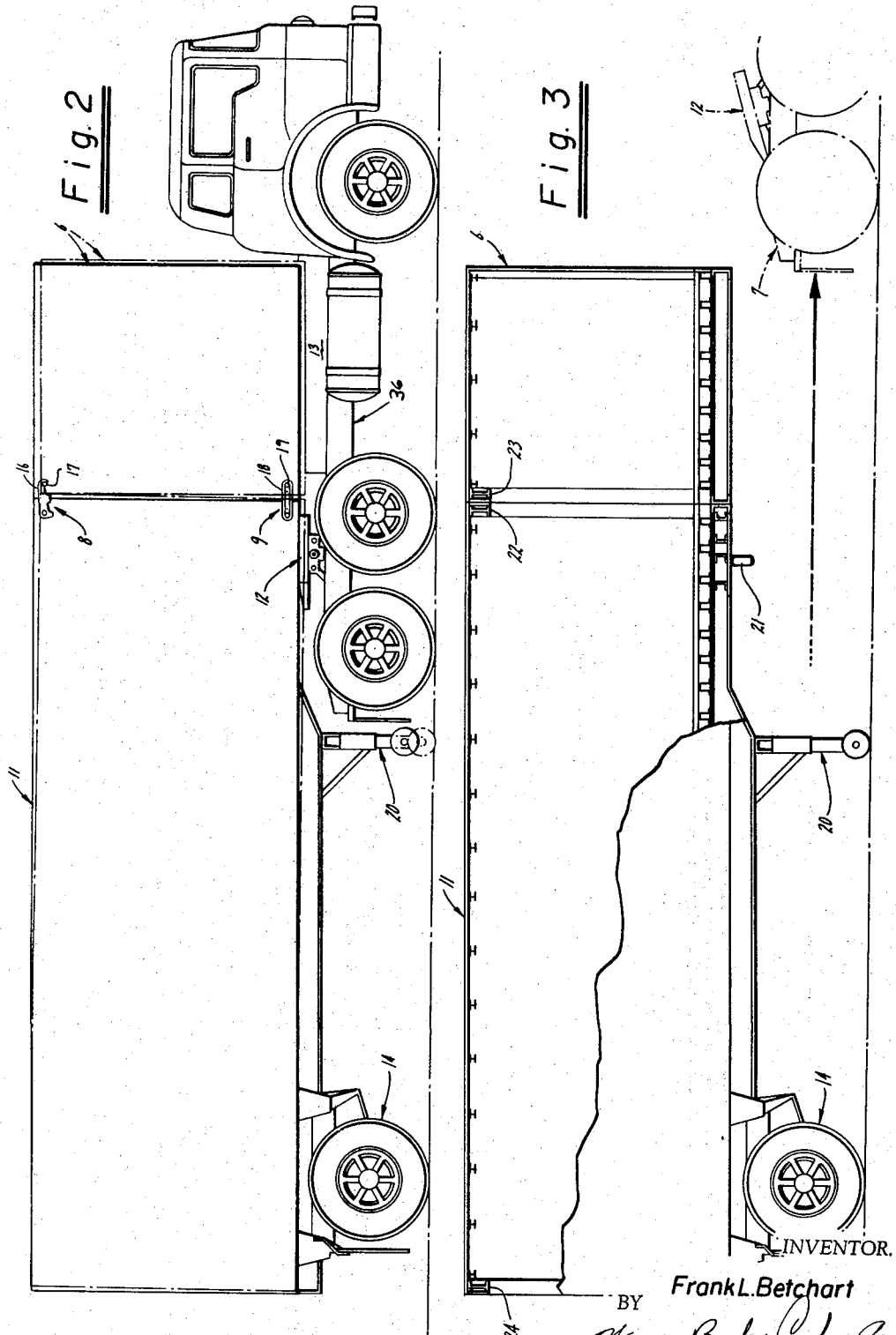

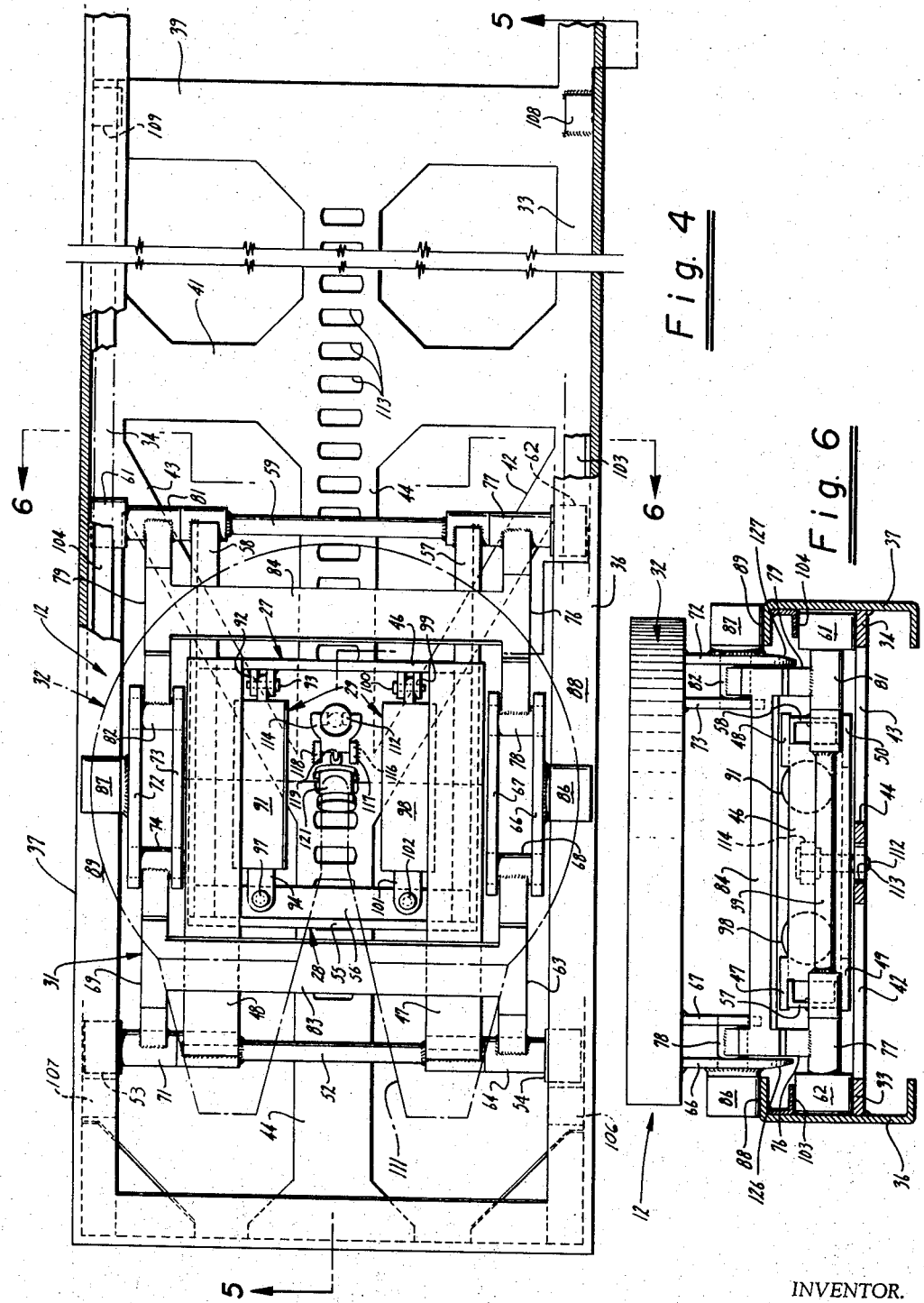

Dec. 26, 1967

F. L. BETCHART 3,360,280

HORIZONTALLY AND VERTICALLY MOVABLE FIFTH
WHEEL FOR TRUCK-TRACTORS

Filed Oct. 6, 1965

INVENTOR.
Frank L. Betchart
BY
*Warren, Brooks, Gypher & Anglin*
*his* Attorneys

United States Patent Office 3,360,280
Patented Dec. 26, 1967

3,360,280
HORIZONTALLY AND VERTICALLY MOVABLE
FIFTH WHEEL FOR TRUCK-TRACTORS
Frank L. Betchart, Fremont, Calif., assignor to Frank L.
Betchart, James R. Cypher, and Thomas Rockwell Kerr
Filed Oct. 6, 1965, Ser. No. 493,416
8 Claims. (Cl. 280—407)

ABSTRACT OF THE DISCLOSURE

A truck tractor fifth wheel assembly consisting of a pair of assemblies movable jointly and relative to one another for independent movement of a fifth wheel horizontally and vertically in combination with a tractor mounted drom releasably coupled to a semi-trailer connected to said fifth wheel.

---

The present invention relates to apparatus for drom carrying truck tractors used in pulling semi-trailers.

In some states, particularly the Western States, overall lengths of truck trailer combinations are presently limited to 60–65 feet. Many semi-trailers are standardized at 40 feet in length and truckers find it advantageous to take advantage of the overall 65 feet limit by using long tractors. These long tractors have, as a consequence, usable carrying space and capacity. Many truckers carry cargo containers on the tractor immediately behind the tractor cab which are utilized for carrying additional cargo. These containers may be about 17 feet in length and as high and wide as the semi-trailer pulled by the tractor and are commonly known as droms. Although droms increase the total cubic volume of the truck rig they presently have several serious limitations which prevent their utilization by many truckers. Most droms are fixedly attached to the tractor and although the semi-trailer can be detached for loading and unloading, the tractor is not freed for other work until the drom is fully loaded or unloaded. Tying up a tractor for loading or unloading a drom frequently cancels any savings effected by the increased load capacity of the semi-trailer-drom combination. A few droms are removably mounted on the tractors but huge fork lifts or cranes are required to lift the droms on and off the tractors and few docking facilities have the necessary equipment.

This application presents an inexpensive apparatus which will enable the truck operator to load and unload droms without the use of auxiliary forklifts, cranes or other equipment. This inventive result has been achieved by, and it is accordingly an object of the present invention to provide; a novel and improved fifth wheel for a drom carrying tractor trailer combination.

Another object of the present invention is to provide an apparatus carried by a truck tractor which will enable the operator of the truck tractor to quickly and easily unload the drom from the tractor by attaching it to the front of the semi-trailer so that the drom and the semi-trailer form one single large semi-trailer for purposes of docking, loading and unloading.

Still another object of the present invention is to provide a fifth wheel for a truck tractor which may be moved forwardly or backwardly in either an elevated or lowered position while supporting a fully loaded semi-trailer with a drom attached thereto.

A further object of the present invention is to provide a tractor fifth wheel of the character described which will enable the truck operator to lift the semi-trailer above the driver wheels to enable the rig to traverse rough and uneven ground and also shift the weight of the trailer on the drivers to improve traction on slippery surfaces.

A still further object of the present invention is to provide a fifth wheel of the character described which will enable the trailer to be lowered so as to reduce the overall height for highway travel permitting higher trailers and greater cubic volume and be able to shift the weight of the trailer on the tractor to boost payloads and meet state highway axle load requirements.

Another object of the present invention is to provide a movable fifth wheel of the character described which will enable the effective overall length of the tractor trailer to be shortened so as to meet state highway maximum length requirements and to provide greater maneuverability in backing and turning as well as to lengthen the overall length where permitted to provide greater operating efficiencies.

A still further object of the present invention is to provide a fifth wheel of the character above described which is capable of sufficiently elevating the forward end of a trailer to substantially clear the trailer auxiliary wheels from the ground enabling a trailer to be picked up, moved to a new location and uncoupled from the tractor without retracting the auxiliary support wheels.

Another object of the present invention is to provide an elevating and traveling fifth wheel constructed to provide an advantageous mechanical advantage thereby reducing the power requirements of the hydraulic elevating mechanism.

Still another object of the present invention is to provide a new and improved carriage for a fifth wheel which can be inexpensively manufactured from a minimum of durable parts which will require a minimum of maintenance and give long and trouble-free service.

A still further object is to provide a fifth wheel which will enable fleet operators to utilize a single tractor for pulling trailers of various lengths and heights and efficiently distribute the weight of the trailer over the tractor axles.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

With reference to said drawings (4 sheets):

FIGURES 1–3 are side elevational views illustrating the manner of unloading a drom from a tractor by attaching it to the semi-trailer.

FIGURE 4 is a plan view of a portion of the apparatus mounted on a truck tractor with portions of the fifth wheel shown in phantom for purposes of clarity.

FIGURE 5 is a cross-sectional view taken substantially along the line 5—5 of FIGURE 4.

FIGURE 6 is a front elevational view showing portions in cross section taken substantially along the line 6—6 in FIGURE 4.

Figure 8:
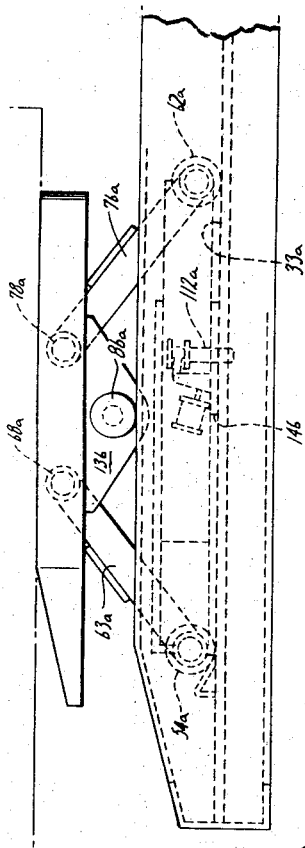
FIGURE 8 is a partial side elevational view of the modified form of a device shown in FIGURE 7.

In general, the present invention is particularly useful where the truck tractor is used to carry droms, but in addition, the present invention may be used to advantage on any standard truck tractor and used to couple trailers, whether droms are used or not.

When used with droms, the invention consists briefly of a drom 6 detachably connected to a tractor 7; means 8 and 9 separably and rigidly coupling the drom and semi-trailer 11 together horizontally so as to produce a unitary structure; and a fifth wheel generally designated 12 adapted for attachment to the tractor for movement horizontally and vertically thereto and being removably connected to the trailer for movement thereof into coupled attachment with the drom.

In using the combination above set forth, the drom is preferably mounted on rails 13 attached to the frame of the tractor and canted at a slight angle rearwardly. Thus when the driver wishes to unload the drom, a relatively level area is selected and he merely sets the wheel brakes on the trailer wheels 14, and backs the tractor to approximatly the distance shown by the phantom lines in FIGURE 1. The drom is mounted on the tractor so that latch 16 on the trailer is in alignment with the pin 17 on the drom. The coupling may be automatic and several systems are in existence such as the coupling system shown in the Bohlen Patent 3,004,772. To complete the coupling, the fifth wheel is raised, thus elevating the forward end of the trailer and the rear end of the drom. The elevating operation is continued until the adjacent sides of the drom and trailer are in alignment and latch 18 couples with pin 19. When the drom is coupled to the semi-trailer as shown in FIGURE 2, the fifth wheel is raised still further so that the drom clears the rail 13. With the trailer brakes still set, the tractor is driven forwardly so that the fifth wheel assembly is moved to the rear of the tractor to permit turning clearance between the drom and the cab. The driver then proceeds to the loading dock. The landing gear 20 is lowered to the ground, and the fifth wheel may then be released from the king pin 21 and the tractor driven out from under the trailer and drom as shown in FIGURE 3. End doors 22 and 23 on the front of the trailer and rear of the drom may be opened to provide a clear passage so that the drom may be unloaded or loaded through the rear door 24 of the trailer.

The tractor may be of any suitable design and construction of the type which carries a fifth wheel element mounted on the rear portion of the tractor chassis where it is accessible for connection to the king pin element on the trailer being towed. Preferably the tractor is of the cab-over engine design with a long chassis to allow maximum length for the drom.

The novel carriage of the present invention which is mounted on the chassis of the tractor and makes possible the loading and unloading operation of the drom above described consists briefly of a first assembly designated generally by the number 27 mounted on the tractor for longitudinal movement thereon; a second assembly designated generally by the number 28 mounted on the tractor for joint longitudinal movement with the first assembly and longitudinal movement relative to the first assembly; power means 29 mounted on the carriage for causing the second assembly to move relative to the first assembly; and an elevating structure designated generally by the number 31 pivotally connected to the first and second assemblies and the top plate 32 of the fifth wheel for elevating the fifth wheel relative to the tractor upon relative longitudinal displacement of the first and second assemblies.

The carriage slides or rolls on longitudinally extending rails 33 and 34 attached respectively to the main frame members 36 and 37 of the tractor chassis. As here shown, the rails are an integral part of a plate which serves to strengthen the chassis and here consists of end rails 38 and 39, cross member 41, diagonal members 42 and 43 and middle rib 44.

The first assembly is here shown as a generally U-shaped frame consisting of a transversely extending plate 46 welded to the ends of longitudinally extending legs 47, 48, 49 and 50. The ends of the legs are attached to, as by welding, transverse shaft 52 and rollers 53 and 54 are rotatively mounted on shaft 52 for rolling receipt on rails 34 and 33, respectively.

The second assembly 28 consists generally of a U-shaped frame dimensioned for interfitting sliding registration with the first assembly and here consists of a transversely extending T-shaped member having a vertical side 55 and a horizontal side 56 joined at right angles to, as by welding, channels 57 and 58. The ends of channels 57 and 58 are joined to transverse shaft 59. Rollers 61 and 62 are rotatably mounted on the end of shaft 59 for rolling receipt on rails 34 and 33 respectively.

The elevating structure generally designated by 31 consists briefly of an arm 63 pivotally connected to shaft 52 at pivot point 64 and to vertical plates 66 and 67 at pivot point 68; arm 69 connected to shaft 52 at pivot point 71 and to vertical plates 72 and 73 at pivot point 74; arm 76 pivotally connected to shaft 59 at pivot point 77 and to vertical plate 66 and 67 at pivot point 78; arm 79 pivotally joined to shaft 59 at pivot point 81 and to vertical plates 72 and 73 at pivot point 82; arms 63 and 69 being stabilized by cross member 83 and arms 76 and 79 being stabilized by transverse member 84. In order to limit the downward travel of the elevating structure and to facilitate longitudinal movement of the carriage along the rails, a pair of rollers 86 and 87 are attached to vertical plates 66 and 72, respectively. Roller 86 rolls freely on the top surface 88 of frame member 36 and roller 87 rolls freely upon top surface 89 of frame member 37. Vertical plates 66 and 72 are formed with beveled extensions 126 and 127 respectively in order to guide the carriage from an elevated to a retracted position between frames 36 and 37.

The power means generally designated 29 for elevating the fifth wheel here consists of a pair of hydraulic rams connected to a fluid pressure source (not shown). Pressure for the ram may be supplied by a pump connected to the power takeoff of the tractor or by an independent electric motor and pump. Controls for the hydraulic ram may be located conveniently in the cab along side the other operating controls. One or more rams may be employed and the device is here constructed with ram cylinder 91 connected to cross member 46 by brackets 92 and pin 93. The ram piston rod 94 is connected to horizontal member 56 by pin 97. Ram cylinder 98 is connected to cross member 46 by brackets 99 and pin 100. Piston rod 101 is connected to the horizontal side 56 by pin 102.

Vertical movement of the base of the carriage is prevented by elongated angles 103 and 104 spaced immediately above roller 62 and 61 respectively and are joined to structural members 36 and 37.

Longitudinal movement is restricted by stops 106 and 107 placed on rails 33 and 34 respectively at the rear of the tractor and stops 108 and 109 placed on rails 33 and 34 respectively at the forward end of the tractor.

Structural members 36 and 37 are in close proximity to the ends of rollers 61, 62, 53 and 54 so as to guide the carriage longitudinally of the tractor.

In operation, the fifth wheel is elevated by applying fluid pressure to cylinders 91 and 98 of the hydraulic rams causing piston rods 94 and 101 to elongate to the rear as shown in FIGURE 4. The force of the hydraulic rams is transferred through pins 102 and 97 to member 56 which is in turn attached to legs 57 and 58. Thus movement of legs 57 and 58 to the rear of the tractor as shown in FIGURE 4 causes shaft 59 to move rearwardly causing arms 76, 79, 63 and 69 to move upwardly thus raising the fifth wheel 32.

The fifth wheel is of standard construction having a guide slot 111 to guide the king pin into firm locking attachment therewith. The modifications of the fifth wheel, as here set forth, do not in any way hinder the normal operation of the fifth wheel and as can be seen in FIGURE 3, the fifth wheel may tilt to the rear in order to pick up a trailer or may be moved to a horizontal position as shown in FIGURE 5 for carrying the trailer.

Longitudinal movement of the carriage is restrained by a pin means which here consists briefly of a pin 112 which releasably registers with a series of longitudinally spaced openings as for example 113 in the rib plate 44 and a yoke 114 connected to a yoke pin 116 pivotally connected to yoke brackets 117 and 118. A bell crank lever means 119 is connected to piston rod 120 which is powered by pressure supplied to air cylinder 121. The controls for operating the pin are conveniently located in the cab of the truck so that the carriage can be locked and unlocked without the driver being required to step from the cab.

It is to be understood that in the loading and unloading operations the drom will cause the trailer to be nose heavy. Where heavy loads are carried it will be necessary to provide a landing leg on the drom in such a way that it extends temporarily beyond the sides of the drom to clear the wheels of the tractor. The legs can either be folded in a retracted position or removed entirely for highway travel. The landing leg is not more completely set forth because of the variety of ways of constructing such a leg and in fact, in bulky low weight loads the landing leg may not be required.

Figure 7:
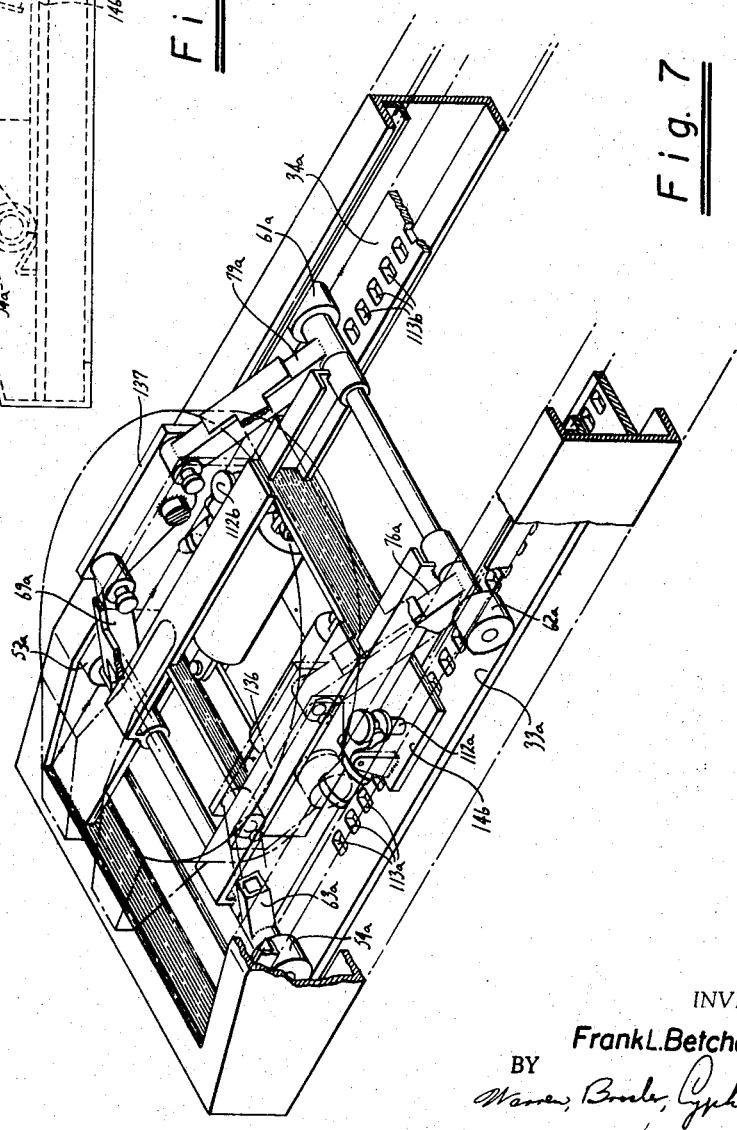
FIGURE 7 is a perspective view of a portion of a modified form of the device.

Referring to FIGURES 7 and 8, a modified form of the fifth wheel assembly is shown.

In order to obtain as low a profile as possible to meet highway height restrictions and permit elevation of the trailer to clear the tractor drivers on rough and uneven terrain, the arms 63a, 76a, 69a and 79a are pivotally connected to members 136 and 137 by pins 68a, 78a, 74a and 82a. Roller 86a is rotatably connected to plate 136 so as to just clear the fifth wheel member 141.

In the modified form, an alternate pin locking arrangement is shown in which two pin assemblies are mounted on cross plate 146 having a structure similar to the pin assembly shown in FIGURE 4 and hereinabove described. Pin 112a moves into and out of registration with slots 113a formed in rail 33a on which rollers 54a and 62a ride.

Pin 112b (not shown), identical to 112a, registers with openings 113b in rail 34a on which rollers 53a and 61a ride.

I claim:

1. A cargo vehicle including a tractor and semi-trailer comprising:
   a drom detachably connected to said tractor;
   means separably and rigidly coupling said drom and semi-trailer together horizontally so as to produce a unitary structure;
   first means including a fifth wheel, a first assembly mounted on said tractor for longitudinal movement relative to said tractor, a second assembly mounted on said tractor for joint longitudinal movement relative to said first assembly; power means mounted on said fifth wheel assembly for causing said second assembly to move relative to said first assembly; and an elevating structure pivotally connected to said first and second assemblies and said fifth wheel for elevating said fifth wheel relative to said tractor upon relative longitudinal displacement of said first and second assemblies and said fifth wheel being removably connected to said trailer for movement of the trailer into coupled attachment with said drom; and
   second means for releasably connecting said first means to said tractor to prevent horizontal movement while permitting elevating movement of said fifth wheel.

2. A cargo vehicle including a tractor and semi-trailer comprising:
   a drom detachably connected to said tractor;
   first means including a fifth wheel, a first assembly mounted on said tractor for longitudinal movement relative to said tractor, a second assembly mounted on said tractor for joint longitudinal movement with said first assembly and longitudinal movement relative to said first assembly; power means mounted on said fifth wheel assembly for causing said second assembly to move relative to said first assembly; and an elevating structure pivotally connected to said first and second assemblies and said fifth wheel for elevating said fifth wheel relative to said tractor upon relative longitudinal displacement of said first and second assemblies, and said fifth wheel being removably connected to said trailer for movement of the trailer into coupled attachment with said drom;
   side rails for guiding said first means so that the front of said semi-trailer may be guided into alignment with the rear of said drom; and
   coupling means separably and rigidly coupling said drom and semi-trailer together horizontally so as to produce a unitary structure.

3. A cargo vehicle including a tractor and semi-trailer comprising:
   a drom detachably connected to said tractor;
   first coupling means separably and hingedly coupling the upper portion of said drom and semi-trailer together;
   second coupling means separably and hingedly connecting the lower portion of said drom and semi-trailer together;
   said first and second coupling means cooperating to couple said drom and semi-trailer so as to produce a unitary structure; and
   first means including a fifth wheel, a first assembly mounted on said tractor for movement longitudinally relative to said tractor, a second assembly mounted on said tractor for joint longitudinal movement with said first assembly and longitudinal movement relative to said first assembly; power means mounted on said fifth wheel assembly for causing said second assembly to move relative to said first assembly; and an elevating structure pivotally connected to said first and second assemblies and said fifth wheel for elevating said fifth wheel relative to said tractor upon relative longitudinal displacement of said first and second assemblies, and said fifth wheel being removably connected to said trailer for movement of the trailer into coupled attachment with said drom.

4. A fifth wheel assembly for a tractor including a fifth wheel comprising:
   a first assembly mounted on said tractor for longitudinal movement thereon;
   a second assembly mounted on said tractor for joint longitudinal movement relative to said first assembly;
   power means mounted on said fifth wheel assembly for causing said second assembly to move relative to said first assembly; and
   an elevating structure pivotally connected to said first and second assemblies and said fifth wheel for elevating said fifth wheel relative to said tractor upon relative longitudinal displacement of said first and second assemblies.

5. A fifth wheel assembly for a tractor including a fifth wheel comprising:
   a first assembly;
   locking means mounted on said first assembly for releasable connection thereof to said tractor;
   a second assembly mounted on said tractor for reciprocal horizontal longitudinal movement relative to said first assembly;
   power means mounted on said fifth wheel assembly for causing said second assembly to reciprocate relative to said first assembly;
   an elevating structure pivotally connected to said first and second assemblies and said fifth wheel for elevating said fifth wheel relative to said tractor upon relative horizontal displacement of said first and second assemblies; and
   said first and second assemblies being attached for joint longitudinal reciprocation relative to said tractor.

6. A fifth wheel assembly for a tractor including a fifth wheel comprising:
   a first U-shaped assembly;
   means mounted on said first assembly for releasable connection thereof to said tractor;
   a second U-shaped assembly mounted on said tractor for sliding reciprocal horizontal longitudinal interlocking movement relative to said first assembly;

power means mounted on said fifth wheel assembly for causing said second assembly to reciprocate relative to said first assembly.

an elevating structure pivotally connected to said first and second assemblies and said fifth wheel for elevating said fifth wheel relative to said tractor upon relative horizontal displacement of said first and second assembly; and said first and second assemblies being attached for joint longitudinal reciprocation relative to said tractor.

7. A fifth wheel assembly for a tractor comprising:

a first assembly having a pair of horizontally spaced rollers adapted for rolling movement longitudinally on said tractor;

pin means mounted on said first assembly and adapted for releasably connecting said fifth wheel assembly to said tractor;

a second assembly having a pair of spaced rollers spaced longitudinally from said first named rollers and being adapted for rolling movement longitudinally on said tractor;

said first and second assemblies being constructed for interlocking sliding movement relative to one another and in concert in a direction longitudinally of said tractor;

hydraulic power ram means having a cylinder mounted on said first assembly and a reciprocating piston rod movable between retracted and extended positions connected to said second assembly;

a first pair of legs pivotally connected to said first assembly and adapted for pivotal connection to said fifth wheel;

a second pair of legs pivotally connected to said second assembly and adapted for pivotal connection to said fifth wheel; and said assemblies and said legs cooperating to elevate said fifth wheel when said ram means is actuated and said piston rod is moved to an extended position.

8. A fifth wheel assembly for a tractor comprising:

a carriage having first and second longitudinally spaced parallel axles each carrying a pair of spaced rollers;

said axles being mounted at right angles to the longitudinal axis of said trailer and being mounted for displacement longitudinally of said tractor relative to one another;

first rail means adapted for connection to the frame of said tractor for supporting said rollers and guiding said carriage longitudinally of said tractor;

a third axle mounted on said carriage intermediate and in elevated parallel relation to said first and second axles and carrying a pair of spaced rollers adapted for rolling movement on said tractor frame;

a pair of frames pivotally connected to and joining said first and third and said second and third axles respectively for elevating said fifth wheel upon movement of said first and second axles relatively closer to one another; and means releasably connecting said carriage to said first rail means permitting free rolling movement of said fifth wheel assembly longitudinally of said tractor.

References Cited
UNITED STATES PATENTS

| | | | |
|---|---|---|---|
| 2,151,640 | 3/1939 | Menning. | |
| 2,776,846 | 1/1957 | Willock | 280—407 |
| 2,799,516 | 7/1957 | Greenway | 280—407 |
| 2,819,096 | 1/1958 | Sencenich | 280—407 |
| 3,139,289 | 6/1964 | Richler | 280—425 |
| 3,163,306 | 12/1964 | Bennett et al. | 280—425 X |

LEO FRIAGLIA, *Primary Examiner.*